United States Patent [19]

Tomlin

[11] 4,044,292
[45] Aug. 23, 1977

[54] PAGE POWER CONVERSION APPARATUS FOR BATTERY CHARGING

[75] Inventor: James J. Tomlin, Sudbury, Mass.

[73] Assignee: Commterm Inc., Maynard, Mass.

[21] Appl. No.: 672,671

[22] Filed: Apr. 1, 1976

[51] Int. Cl.² .......................... H02J 7/00; H04B 1/08
[52] U.S. Cl. .................................. 320/2; 174/52 R; 325/16
[58] Field of Search ........................ 320/2-5; 325/16; 174/52 R

[56] References Cited

U.S. PATENT DOCUMENTS

| 3,379,952 | 4/1968 | Tarrson | 320/2 |
| 3,521,050 | 7/1970 | Shagena, Jr. | 320/2 X |
| 3,763,434 | 10/1973 | Blesch et al. | 325/16 X |

Primary Examiner—Robert J. Hickey
Attorney, Agent, or Firm—Kenway & Jenney

[57] ABSTRACT

Compact conversion apparatus fits within a small space in a densely-constructed, battery-powered pager to convert the unit from use only with non-rechargeable replacement batteries to operation with a rechargeable battery. Notwithstanding space limitations, the conversion apparatus leaves the battery secure against an accidental short circuit at the newly-added, externally-accessible power input.

9 Claims, 5 Drawing Figures

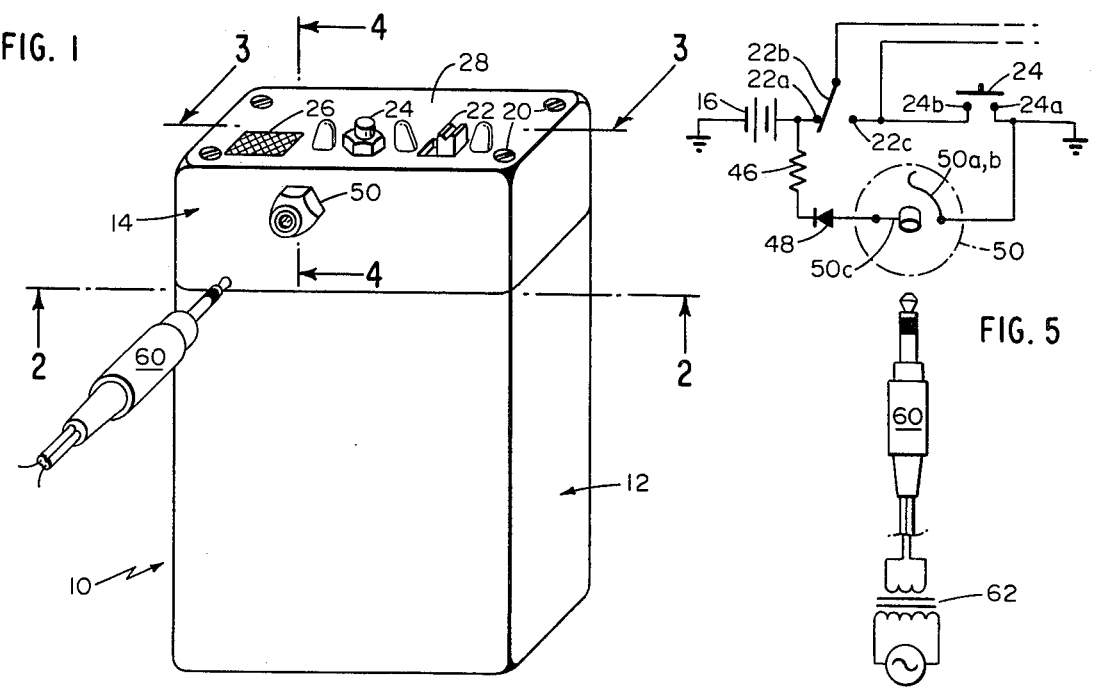
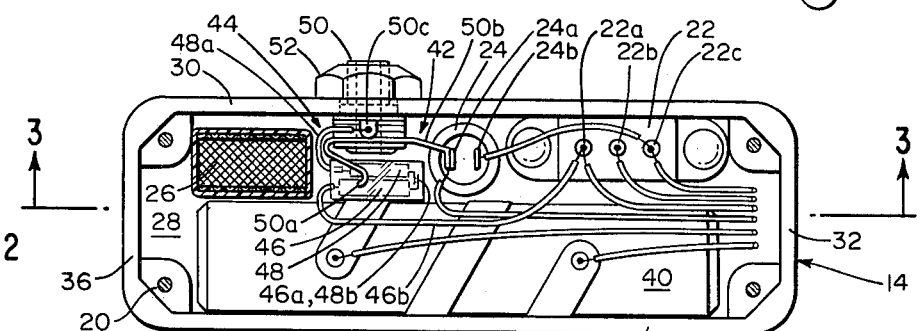
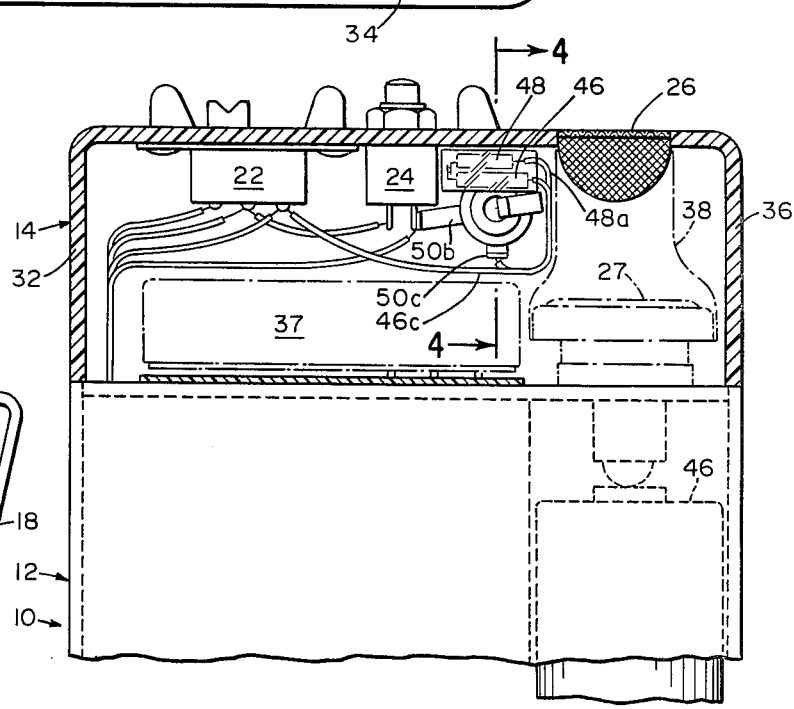
FIG. 1
FIG. 5
FIG. 2
FIG. 4
FIG. 3

PAGER POWER CONVERSION APPARATUS FOR BATTERY CHARGING

BACKGROUND

This invention relates to power conversion apparatus for a pager. The conversion apparatus enables a battery-powered pager of the type constructed without the capability for recharging the battery, and hence which requires continual battery replacement, to house a battery which is rechargeable without removal from the unit.

Pagers are highly compact, portable radio receivers which signal a user from afar. In a typical instance, a user carries the pager on his clothing, and relies on it to receive paging calls from home or a business office. While some pagers are rechargeable, other models such as the models TP 11 and TP 21 of Bell & Howell Communications Company, are constructed without recharging capability. The latter pagers require that the battery be replaced. In general practice, users lease their pagers from a communications service firm, and this company sends a fresh replacement battery to each user monthly, or on some other regular time schedule. This is costly, both for purchase of replacement batteries, and for packaging and shipping. Further, it is inconvenient for the user to change batteries repeatedly, and the replacement procedure exposes the pager circuits to damage.

Nevertheless, tens of thousands of pagers which require periodic battery replacement are in use. The conversion of these units to rechargeable battery operation would clearly be advantageous, but it has not been done. One difficulty in making such conversion is the unavailability of a conversion assemblage which can be installed within the crowded case of a pager and which also is operationally sound. One operational problem is to ensure that the added charging terminals do not expose the battery to accidental short circuit.

Accordingly, it is an object of this invention to provide conversion apparatus for retrofitting a non-rechargeable pager to rechargeable operation. Another object is to provide such conversion apparatus which is sufficiently compact to fit within the original case of the pager.

It is also an object of the invention to provide a conversion kit of the above character which can be installed relatively easily and without highly skilled personnel.

A further object of the invention is to provide a power conversion kit of the above character which does not expose the battery to external short circuit.

Other objects of the invention will in part be obvious and will in part appear hereinafter.

GENERAL DESCRIPTION

The installation in a non-rechargeable pager of components for the conversion to rechargeable power is difficult because the unit conventionally employs such compact construction, with high component density, that there is insufficient space for the conversion parts. Further, the conversion should not interfere with the operation or servicing of the pager, and it should not subject the internal battery to accidental discharge. It is also important that the conversion involve only connections to the pager circuit at accessible points, so that the installation can be done without costly equipment or skill, and without risk of danger to the existing electrical elements of the pager.

The invention stems from the realization of a successful solution to the foregoing objects for a pager construction of the kind which the above models employ. This construction has a case roughly the shape and size of an ordinary cigarette package and in which there is a complete battery-powered FM receiver set to the user's frequency channel and signal code. The top one-quarter or so of the case is a removable top cover. In the cover are the operator controls, including an on-off switch and a reset switch, and the grill for the paging buzzer. The pager antenna coil is also housed within the top cover. Electrical leads connect these elements to the pager circuit, including the battery, housed within the other portion of the case.

It has now been found that a small void within the cover can house a jack for the application of alternating recharge current and can house the elements of a half-wave rectifier of the recharge current. It has also been found that existing conductors and terminals within the housing cover can provide all the needed connections to the interior of the pager from the added recharging circuit.

Accordingly, the power conversion apparatus of the invention provides an externally-powered rectifier within the small space available in the top cover of the case, and utilizes existing conductors to connect to the internal battery. An external transformer, such as is in common use for recharging electronic calculators, provides the requisite voltage and current levels for safe charging of the pager battery.

Once a pager is fitted with the new conversion kit, the leasing operator is free of the costly battery replacement program, and the user is free of the continual requirement to open the case for another battery replacement. Instead, the user simply plugs the recharge cord leading from the separate transformer into the newly-installed jack on the pager case; this can even be done while the pager is in use. Further, the user who recharges on schedule is assured of sufficient battery capacity.

The invention accordingly comprises the features of construction, combination of elements, and arrangement of parts exemplified in the embodiment set forth below; and the claims indicate its scope.

BRIEF DESCRIPTION OF THE DRAWINGS

For a fuller understanding of the nature and objects of the invention, reference should be had to the following detailed description and the accompanying drawings, in which:

FIG. 1 shows a pager originally manufactured without a recharge capability and fitted with the conversion apparatus of this invention;

FIG. 2 is a plan view of the top cover of the paging unit of FIG. 1 showing the original and the conversion components;

FIG. 3 is a longitudinal cross-sectional showing within the pager top cover taken along line 3—3 of FIGS. 1 and 2;

FIG. 4 is a transverse sectional view of the pager taken along line 4—4 of FIGS. 1 and 3; and FIG. 5 is a schematic drawing of the recharging conversion circuit which the invention provides.

DESCRIPTION OF ILLUSTRATED EMBODIMENT

FIG. 1 shows a pager 10 of the construction to which the invention can be applied. The unit, which has a volume under 5.5 cubic inches, signals the user with an audible tone when it is paged by a radio frequency call signal of selected modulation and coding. The user releases the tone, and activates the pager for new calls, by momentarily depressing a reset switch.

As FIGS. 1, 3 and 4 show, a lower housing 12 and top cover 14 form the pager case. The housing 12, which typically mounts a clip 18 for securing the pager to the user's clothing, contains the battery 16 (FIG. 3) and the major portion of the electronic circuits. The housing 12 must be removed in order to gain access to the battery 16, as is required for the conventional replacement of the battery.

The case top cover 14 contains the operator controls. These are an on-off switch 22 and a reset switch 24. There is also a grill 26 for the acoustic transducer or buzzer 27 (FIG. 3) that produces the signalling tone when the pager is "called". The cover 14, formed with an end wall 28 and peripheral sidewalls 30, 32, 34 and 36, is removable from the lower housing by removing four screws 20 and lifting it from the housing.

The top cover 14 carries elements of the pager only adjacent the top end wall 28. As FIGS. 3 and 4 show, the switches 22 and 24 and the grill 26 are located there along the cover sidewall 30; and a coil antenna 40 is located there along the other sidewall 34. The remainder of the space within the cover 14 receives elements (shown with broken lines in FIGS. 3 and 4) mounted with the housing 12, namely decoding elements 37 and 39, the transducer 27 and an acoustic horn 38.

As FIGS. 2, 3 and 5 show, the original construction of the illustrated pager 10 includes a lead connected from a contact 24a of the reset switch to a ground point of the pager circuit, and a lead connected from the other reset contact 24b to contact 22c of the on-off switch. A further lead connects contact 22a of the on-off switch to one terminal of the battery 16, the other terminal of which is connected to the circuit ground.

With further reference to FIGS. 2, 3 and 4; it has now been found that the small space indicated at 42 between the grill and speaker horn on one side, the reset switch 24 on the other side, and further bounded by the antenna 40 and by the decoding element 37, can accommodate a power converter stage 44 without interference with the functioning of the adjacent and other elements of the pager. It should be noted that the space 42 is empty when the pager 10 is originally manufactured, and that the drawings show a pager with the subsequent addition of the converter stage 44. Further, the pager 10 as originally manufactured is designed for use with a battery 16 that cannot be charged while within the pager, and hence which in typical practice is periodically replaced. However, as will now be described, the power converter stage 44 enables the pager 10 to employ a rechargeable battery 16 which can readily be recharged repeatedly without opening the pager case.

The power converter stage 44 which provides this operation and fits within the space 42, so that no original components of the pager 10 need to be replaced or relocated, employs a fixed resistor 46, a semi-conductor rectifyng diode 48, and an electrical receptacle or jack 50. The installation of these power converter components within the pager top cover 14 requires only that a hole be drilled through the sidewall 30, centered at the space 42 and dimensioned to receivingly seat the shank of the jack 50. The jack is inserted through the hole from within the top cover and secured in place with a hex nut 52. This is the only element which the power converter stage adds to the exterior of the pager. The preferred jack illustrated has two electrically-conductive parts: one forms a wiper contact 50a and a radially-opposite tab 50b. The other is a sleeve contact from which a tab 50c extends at a location circumferentially between the contact 50a and the tab 50b (FIG. 3). With this configuration of contacts, the jack preferably is oriented as shown in FIG. 3, so that the wiper contact 50a and tab 50b are aligned to extend between the short sidewalls 32 and 36. The other tab 50c is disposed vertically lowermost, to extend toward the opening into the top cover 14.

With this preferred configuration of the jack, or with whatever other equivalent configuration is available, the contacts of the jack are connected electrically in series with the resistor 46 and diode 48 between the existing grounded terminal 24a on the reset switch 24 and the terminal 22a of the on-off switch. More particularly, with the illustrated configuration, the wiper-connecting tab 50b is located for direct connection, i.e., without an interconnecting lead, to the contact 24a of the reset switch. The other jack tab 50c is connected to one lead 48a (illustrated as the anode lead) of the diode 48. The other diode lead 48b is trimmed and connected directly to one lead 46a of the resistor. This interconnection between the resistor and the diode preferably is made before these two components are nested into the space 42. The other resistor lead 46b is arranged around the resistor and the reset switch 24 and connected to contact 22a of the on-off switch. This connection thus makes use of the existing switch wiring to connect the resistor to the non-grounded terminal of battery 16.

In order to fit within the space 42, the resistor 46 and diode 48 are nested side by side close to the end wall 28 with the longitudinal axes of their cylindrical bodies parallel and extending longitudinal to the sidewall 30. These two components preferably are pre-assembled with their leads 46a and 48b trimmed short and soldered together as shown, and then inserted into the cover 14. Where desired, a sleeve or wrap 54, of electrically insulating material of sufficient thermal stability to resist deformation due to any heat which these components develop in operation, encases the pre-assembled diode-resistor combination to prevent inadvertent short circuit within the cramped space 42 to other elements and particularly the contacts of jack 50. The components 46 and 48 are nested between the wiper contact 50a of the jack and the cover end wall 28. The close proximity of the jack tabs with the resistor and diode enable them to be interconnected with the existing diode lead 48a rather than requiring an additional interconnecting conductor. Similarly, the preferred compact packaging within the pager top cover enables the jack tab 50b to connect directly to the reset switch.

FIG. 5 shows the schematic circuit of the power converter stage 44, together with a portion of the pager circuit 10 to which it connects. As indicated, the pager battery 16 is connected internally between a circuit ground and the contact 22a of the on-off switch; the other switch contacts 22b and 22c connect to other points within the pager. The reset switch also has one contact 24b that connects to other elements of the pager, and the contact 24a is connected to the circuit ground. With these existing connections in the pager 10, the battery 16 is in series between the on-off contact 22a and the reset contact 24a. Hence these contacts, which are accessible within the top cover 14, enable the converter power stage of the invention to charge a rechargeable battery 16 with current applied to the jack 50.

Charging current is readily applied to the jack 50 by way of a mating plug 60 connected to the secondary winding of a step-down transformer 62, the primary of which is connected to a 115 volt a.c. line voltage or other supply alternating power. The transformer 62 and plug 60 typically are similar to battery-charging equipment commercially available for charging electronic pocket calculators. The pager 10 can be on, i.e. in the operating condition, when connected with the plug 60; that is, the charging of the battery 16 in accordance with the invention does not interfere with the operation of the pager.

It is also noteworthy that the rechargeable power conversion which the invention provides houses the power receiving contacts, i.e., the contacts of jack 50, and houses a current limiter and a rectifier, i.e., the resistor 46 and diode 48, all within the case of the pager. This is in contrast, for example, to simply providing conductive leads from the internal battery directly to externally-accessible contacts. The latter practice has been followed but is undesirable because it subjects the battery to accidental short circuit. However, with the present invention, the resistor and diode which are in series between the battery and the contacts of the jack 50 protect the battery from accidental discharge. In addition, the jack 50 is of the type which has no external or openly accessible contacts; the jack contacts are accessible only with a mating plug or like penetrating structure. The invention thus not only provides the advantages of rechargeable battery operation for an otherwise non-rechargeable pager of the construction shown, but provides this feature with protective safety for the battery. This is highly desirable, for the battery which the pager generally uses is of a high current capacity type which, upon accidental short circuit, can cause distructive damage.

By way of illustration and for use with a 3-cell 4.2 volt battery 16 that is to be charged with a 15 milliampere current, a converter stage 44 as illustrated can be constructed with a 120 ohm 1/4 watt carbon resistor 46, a type 660J jack 50, and with a type 1N914 diode 48. The transformer 62 converts a 115 volt alternating line voltage to a 9.1 volt RMS level, and develops an open circuit secondary voltage of approximately 9.4 volts RMS.

It will thus be seen that the objects set forth above, among those made apparent from the preceding descriptions, are efficiently attained. Since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described the invention what is claimed as new and secured by Letters Patent is:

1. In a battery-powered pager originally constructed without arrangement for charging the battery while installed therein, said pager having a case with a removable top cover having an end wall and sidewalls and having mounted therein along one sidewall the pager on-off switch and the pager reset switch, each such switch having one contact connected to a different terminal of a battery installed therein, the improvement of
   conversion apparatus for charging the pager battery while operatively installed therein, said conversion apparatus comprising in combination
   A. a component assembly disposed within the top cover and including a fixed resistor and a semiconductor rectifying diode,
   B. a power-receiving jack mounted to one cover wall through a hole therethrough adjacent the location of said component assembly, said jack having first and second contacts and being removably and replaceably connectable with a mating electrical plug for applying an alternating-voltage current from the plug to said jack contacts, and
   C. means connecting said first and second jack contacts in series with said resistor and said diode between said one contact of said on-off switch and said one contact of said reset switch.

2. In a pager according to claim 1, the further improvement wherein said connecting means includes a connection of one lead of said diode with one lead of said resistor, and a direct connection of one jack terminal to one said switch terminal.

3. In a pager according to claim 2, the further improvement wherein said connection means further includes connections of the other leads of said diode and of said resistor to said other jack terminal and to said other switch terminal.

4. In a pager according to claim 1, the further improvement wherein said resistor and said diode are nested within the pager top cover between contacts of said jack and the cover end wall.

5. In a pager according to claim 1, the further improvement wherein said contacts of said jack are located fully within the pager top cover.

6. In a pager according to claim 1, the further improvement wherein said jack is mounted to a sidewall of said top cover.

7. In a pager according to claim 1, the further improvement wherein said component assembly is disposed in a space contiguous with said reset switch.

8. In a battery-powered pager originally constructed without arrangement for charging the battery while installed therein, said pager having a case consisting of a lower housing and a removably replaceable top cover which has an end wall and sidewalls and having mounted within the top cover along one sidewall the pager on-off switch and the pager reset switch, and having two contacts of such switches connected to different terminals of a battery installed therein, the improvement comprising
   a battery-recharging stage disposed within the top cover nested within a space bounded by original elements of the pager and comprising the combination of
   A. a power-receiving jack mounted to said one sidewall and having first and second contacts, said jack removably and replaceably connectable from outside the top cover with a mating electrical plug for applying an alternating-voltage current from the plug to said jack contacts, and B. an electrical resistor and an electrical rectifier, said resistor and said rectifier being connected in series with said jack contacts between said two switch terminals.

9. In a pager according to claim 8, the further improvement wherein one contact of said jack abuts one such switch contact and is in electrical engagement therewith.

* * * * *